United States Patent Office

Re. 25,789
Reissued June 1, 1965

25,789

METHOD AND COMPOSITION FOR BRIGHTENING ALUMINUM

Marion D. Barnes, Glendale, Mo., assignor to Monsanto Chemical Company, St. Louis, Mo., a corporation of Delaware No Drawing. Original No. 3,094,489, dated June 18, 1963, Ser. No. 836,942, Aug. 31, 1959. Application for reissue Jan. 30, 1964, Ser. No. 353,310
9 Claims. (Cl. 252—79.2)

Matter enclosed in heavy brackets [ ] appears in the original patent but forms no part of this reissue specification; matter printed in italics indicates the additions made by reissue.

This invention relates to the chemical brightening of metals, and is especially concerned with the chemical brightening of aluminum. The invention also relates to improved acid compositions suitable for use in chemical brightening of metals.

In recent years there has been a marked increase in the use of chemical brightening procedures for polishing metallic surfaces. One of the more common processes used particularly in brightening metallic aluminum is carried out by treating the metal surfaces with a mixture of concentrated phosphoric and nitric acids. That process is described in greater detail in Cohn, U.S. 2,729,551, the disclosure of which is hereby incorporated by reference into the present specification. It will be noted from the Cohn patent that compositions particularly suitable for brightening aluminum or its alloys generally contain between about 45 and about 98 weight percent of free phosphoric acid, between about 0.5 and about 50 weight percent of free nitric acid and between about 2 and about 35 weight percent of water. Particularly preferred brightening compositions contain between about 65 and about 85 weight percent of free phosphoric acid, between about 1 and about 10 weight percent of free nitric acid and between about 5 and about 34 weight percent of water. It might be added that after the compositions have been utilized for a period of time in the treatment of metals, significant concentrations of metallic phosphate salts will also build up in the treating compositions. For example, brightening compositions used for treating aluminum will generally contain between about 1 and about 20 weight percent of aluminum phosphate. The presence of such metal phosphate salts dissolved in the brightening compositions is generally not harmful, and in some instances may actually be helpful in so far as brightening of the metal surfaces is concerned.

In utilizing the foregoing acid compositions containing concentrated nitric acid, difficulty is often encountered because of $NO_2$ fumes released from such compositions. Such fumes are both disagreeable and toxic, and the presence thereof requires expensive precautionary measures and facilities for counteracting the resulting dangers. It has now been found that the evolution of $NO_2$ fumes from the compositions described above can be markedly reduced or substantially eliminated by the addition to such compositions of ammonia, ammonium hydroxide or an ammonium salt in concentrations such that the ionic ratio of ammonium ions to nitrate ions in the compositions is maintained at or above 0.8, and preferably above about 1.1 or even above 1.3.

The exact mechanism whereby the addition of ammonia, ammonium hydroxide or ammonium salts prevents the evolution of $NO_2$ fumes is not completely understood, but it is found that most of the nitrogen evolving from the compositions is in the form of $N_2$ instead of $NO_2$. Surprisingly enough, it appears that the effect of the ammonium compounds is catalytic, since there is no loss or decrease in the amonium ion concentration accompanying the conversion of $NO_2$ to $N_2$. Because of this unexpected lack of consumption of ammonium ion, it is possible to maintain the ammonium ion concentration at a constant and controlled level by adding the ammonia or ammonium compound in a fixed ratio along with the phosphoric acid. For this reason the addition of an ammonium compound as a solution in the phosphoric acid constitutes a preferred embodiment of this invention—as does also the phorphoric acid solution to which the critical concentration of ammonium compound has been added.

This latter embodiment of the invention comprises concentrated aqueous solutions of at least 75 weight percent $H_3PO_4$, and preferably at least 80 weight percent of $H_3PO_4$, to which between about .25 and about 4 weight percent, and preferably between about 0.5 and about 2 weight percent, of ammonium ion (based upon the total composition) has been added in the form of ammonia or an ammonium compound. Preferred compounds for such addition are inorganic ammonium salts, and particularly ammonium phosphate salts such as diammonium orthophosphate. However, any other ammonium salts, such as ammonium sulphate, ammonium bisulphate, ammonium nitrate, monoammonium orthophosphate, ammonium metaphosphate, ammonium chloride, ammonium fluoride, ammonium fluoborate, ammonium arsenate, ammonium vanadate, as well as numerous others, will serve equally well in reducing or eliminating $NO_2$ fume evolution from the concentrated mixtures of phosphoric and nitric acids. Typical specific examples of the foregoing preferred phosphoric acid/ammonium salt compositions are solutions prepared by:

(a) Adding 7 parts by weight of monoammonium orthophosphate to 93 parts by weight of 75% phosphoric acid (which will then contain 1.09 weight percent of ammonium ion);

(b) Adding about 4.4 parts by weight of diammonium orthophosphate to about 95.6 parts by weight of 80% phosphoric acid (which will then contain about 1.2 weight percent of ammonium ions);

(c) Adding about 5 parts by weight of diammonium orthophosphate to about 95 parts by weight of 85% phosphoric acid (which will then contain about 1.36 weight percent of ammonium ions).

The obvious benefits resulting from the use of composi tions such as the foregoing are illustrated by the follow ing comparison:

An aluminum brightening operation was carried ou by dipping metallic aluminum objects for about 2 minute into a chemical brightening composition containing abou 3 weight percent $HNO_3$, about 76 weight percent $H_3PO_4$ about 4 weight percent of $AlPO_4$, and about 17 weigh percent of $H_2O$ at a temperature of about 90° C. Copiou quantities of $NO_2$ fumes were evolved from the treatin bath, particularly whenever the metallic aluminum ot jects were immersed in the bath. The same operatio was carried out after incorporating about 4 weight pe cent (based upon the total bath composition) of d ammonium orthophosphate. After the addition of the am monium salt there was no further evolution of NC fumes. There was also a significant reduction in bot nitric acid and phosphoric acid consumption, but n noticeable decrease in effectiveness of the composition a brightening bath.

Because of the so-called "drag out losses" resultir from liquid adhering to treated metal parts, it is nece sary to replenish the bath components from time to tim In the operation described in the preceding paragrap replenishment of ammonium compound and phosphor acid is conveniently effected by adding these two ingred ents as a solution prepared by dissolving 4.2 parts b weight of diammonium orthophosphate to 95.8 parts by weight of 85% $H_3PO_4$.

What is claimed is:

1. A liquid concentrated phosphoric acid useful, when intermixed with from about 0.5 to about 50 weight percent, based on the weight of said concentrated phosphoric acid, of nitric acid, for inhibiting the normal tendency of the resulting composition to evolve nitric oxide fumes when the ionic ratio of $NH_4^+/NO_3^-$ in said resulting composition is at least about 0.8, and when it is utilized for brightening surfaces of metallic aluminum and aluminum alloys; said concentrated phosphoric acid containing less than about [25] *15* weight percent of water, and said acid having intermixed therewith a material selected from the group consisting of ammonia, ammonium hydroxide and ammonium salts in an amount sufficient to produce an ammonium ion concentration between about 0.25 and about [4] *2* weight percent.

2. A liquid concentrated phosphoric acid useful, when intermixed with from about 0.5 to about 50 weight percent, based on the weight of said concentrated phosphoric acid, of nitric acid, for inhibiting the normal tendency of the resulting composition to evolve nitric oxide fumes when the ionic ratio of $NH_4^+/NO_3^-$ in said resulting composition is at least about 0.8, and when it is utilized for brightening surfaces of metallic aluminum and aluminum alloys; said concentrated phosphoric acid containing less than about [20] *15* weight percent of water, and said acid having intermixed therewith an ammonium phosphate in an amount sufficient to produce an ammonum ion concentration between about 0.25 and about [4] *2* weight percent.

3. A liquid concentrated phosphoric acid useful, when intermixed with from about 0.5 to about 50 weight percent, based on the weight of said concentrated phosphoric acid, of nitric acid, for inhibiting the normal tendency of the resulting composition to evolve nitric oxide fumes when the ionic ratio of $NH_4^+/NO_3^-$ said resulting composition is at least about 0.8, and when it is utilized for brightening surfaces of metallic aluminum and aluminum alloys; said concentrated phosphoric acid containing less than about 15 weight percent of water, and said acid having intermixed therewith diammonium orthophosphate in an amount sufficient to produce an ammonium ion concentration between about 0.25 and about 2 weight percent.

4. A liquid concentrated phosphoric acid useful, when intermixed with from about 0.5 to about 50 weight percent, based on the weight of said concentrated phosphoric acid, of nitric acid, for inhibiting the normal tendency of the resulting composition to evolve nitric oxide fumes when the ionic ratio of $NH_4^+/NO_3^-$ in said resulting composition is at least about 0.8, and when it is utilized for brightening surfaces of metallic aluminum and aluminum alloys; said concentrated phosphoric acid containing less than about 20 weight percent of water, and said acid having intermixed therewith ammonium nitrate in an amount sufficient to produce an ammonium ion concentration between about 0.25 and about 4 weight percent.

5. An acid composition suitable for brightening surfaces of metallic aluminum and aluminum alloys, which composition comprises between about 45 weight percent and about 98 weight percent of free phosphoric acid, between about 0.5 weight percent and about 50 weight percent of free nitric acid, between about 2 weight percent and about 35 weight percent of water, and with which composition has been intermixed an ammonium salt in a sufficient concentration to make the ionic ratio of $NH_4^+/NO_3^-$ equal to at least 0.8.

6. The acid composition of claim 5 in which the ammonium salt is an ammonium orthophosphate.

7. In the method of treating the surfaces of metallic aluminum and aluminum alloys with an acidic mixture containing between about 45 and about 98 weight percent of free phosphoric acid, between about 0.5 and about 50 weight percent of free nitric acid, and between about 2 and about 35 weight percent of water, the improvement which comprises incorporating into said acidic mixture a material selected from the group consisting af ammonia, ammonium hydroxide and ammonium salts in an amount sufficient to maintain the ionic ratio of $NH_4^+/NO_3^-$ equal to at least 0.8.

8. An acid composition suitable for brightening surfaces of metallic aluminum and aluminum alloys, which acid composition comprises at least about 45 weight percent of phosphoric acid and nitric acid, the ratio of said nitric acid to said phosphoric acid in said acid composition being such that said acid composition has a natural tendency when employed at elevated temperatures to release nitric oxide fumes, and an amount of a compound capable of releasing ammonium ions which is sufficient to suppress said tendency of said acid composition to release nitric oxide fumes, the ionic ratio of $NH_4^+/NO_3^-$ in said acid composition being at least about 0.8.

9. An acid composition suitable for brightening surfaces of metallic aluminum and aluminum alloys, which acid composition comprises between about 65 and 85 weight percent of free phosphoric acid, between about 1 and about 10 weight percent of nitric acid, the ratio of said nitric acid to said phosphoric acid in said acid composition being such that said acid composition has a natural tendency when employed at elevated temperatures to release nitric oxide fumes, and between about 5 and about 34 weight percent of water, with which acid composition has been intermixed a material selected from the group consisting of ammonia, ammonium hydroxide and ammonium salts in an amount sufficient to maintain the ionic ratio of $NH_4^+/NO_3^-$ in said acid composition equal to at least 0.8 in order to substantially reduce said tendency of said acid composition to release nitric oxide fumes.

References Cited by the Examiner

The following references, cited by the Examiner, are of record in the patented file of this patent or the original patent.

UNITED STATES PATENTS

| | | | |
|---|---|---|---|
| 2,446,060 | 7/48 | Pray et al. | 252—79.2 XR |
| 2,620,265 | 12/52 | Hesch | 252—79.2 X |
| 2,729,551 | 1/56 | Cohn | 252—79.2 XR |
| 2,746,849 | 5/56 | Helling et al. | 252—79.2 XR |

OTHER REFERENCES

Muromtsev et al. (Izvestiya Akadem II Nauh SSSR, 1938 (Bulletin de l'Academie des Sciences de 1; URSS)): "Investigation Concerning the Solubility of the System $NH_3$—$H_3PO_4$—$H_2O$," pages 177–184.

JULIUS GREENWALD, *Primary Examiner.*